United States Patent [19]
Gibbon

[11] Patent Number: 5,088,179
[45] Date of Patent: Feb. 18, 1992

[54] METHOD OF FORMING A MICROWAVEABLE CONTAINER

[75] Inventor: Robert M. Gibbon, Fort Worth, Tex.

[73] Assignee: JMK International, Inc., Fort Worth, Tex.

[21] Appl. No.: 596,946

[22] Filed: Oct. 12, 1990

[51] Int. Cl.⁵ ............................................. B05D 5/00
[52] U.S. Cl. ................................. 29/458; 427/230;
427/387; 426/113; 426/234; 426/243; 428/34.7
[58] Field of Search ............ 427/387, 230; 428/34.7,
428/35.7; 426/234, 113, 243; 29/458

[56] References Cited

U.S. PATENT DOCUMENTS

| | | | |
|---|---|---|---|
| 4,011,197 | 3/1977 | Lee | 528/32 |
| 4,191,817 | 3/1980 | Schiller et al. | 528/38 |
| 4,302,512 | 11/1981 | Weitemeyer et al. | 427/387 |
| 4,703,149 | 10/1987 | Sugisawa et al. | 426/234 |
| 4,704,510 | 11/1987 | Matsui | 219/10.55 E |
| 4,728,762 | 3/1988 | Roth et al. | 219/10.55 E |
| 4,870,233 | 9/1989 | McDonald et al. | 219/10.55 E |
| 4,880,951 | 11/1989 | Levinson | 219/10.55 E |
| 4,892,213 | 1/1990 | Mason, Jr. | 220/4 B |

FOREIGN PATENT DOCUMENTS 63-102935  5/1988  Japan .

*Primary Examiner*—Shrive Beck
*Assistant Examiner*—Cary A. Veith
*Attorney, Agent, or Firm*—Charles D. Gunter, Jr.

[57] ABSTRACT

A method is shown for forming a microwaveable container which is heated in the presence of microwave energy to warm contents placed within the container. The container has at least one exposed wall which does not contact the contents of the container. The exposed wall of the container is coated with a microwaveable, room temperature vulcanizable composition and allowed to cure. Exposure of the coated cup to microwave energy serves to heat the contents within the container.

4 Claims, 1 Drawing Sheet

METHOD OF FORMING A MICROWAVEABLE CONTAINER

BACKGROUND OF THE INVENTION

1. Field of the Invention:

The present invention relates generally to microwave heating of food and drink products and pertains more specifically to a method for rendering a container microwaveable by applying thereto a microwaveable, room temperature vulcanizable composition.

2. Description of the Prior Art:

Various containers and packaging arrangements are known for heating food and drink products in a microwave oven. For instance, U.S. Pat. No. 4,892,213, issued Jan. 9, 1990, shows a microwave cooking and serving dish which is transparent to microwave radiation so that food in the dish may be cooked in a microwave oven. U.S. Pat. No. 4,704,510, issued Nov. 3, 1987, shows a food packaging container which can withstand heating in a microwave oven. It is formed of a laminate sheet material comprising a non-stretched polyethylene terephthalate film or sheet laminated on the interior side of a foamed sheet.

The present invention has as its object to provide a method for forming a microwaveable container which is well adapted for heating food and drink products in a microwave oven.

Another object of the invention is to provide a container having improved insulating qualities for retaining the heat applied to a food or drink product by a microwave oven.

The invention also has as its object to provide a method for forming a microwaveable container by applying a room temperature vulcanizable material to a selected wall of the container, the room temperature vulcanizable composition having blended therein an electromagnetic absorptive material which is actuated upon exposure to microwave energy.

SUMMARY OF THE INVENTION

In the present invention, a microwaveable container is provided which is heated in the presence of microwave energy to warm contents placed within the microwaveable container. The container has a liner including an external liner wall which does not contact the contents of the container. The external liner wall of the container is coated with a microwaveable, room temperature vulcanizable composition. The composition is allowed to cure on the external liner wall, thereby producing a microwaveable container. Preferably, the room temperature vulcanizable composition is a room temperature vulcanizable rubber having blended therein an electromagnetic absorptive material. For instance, the microwaveable room temperature vulcanizable rubber can be a hydroxyl end stopped organopolysiloxane fluid containing a cross-linker and a catalyst.

In a preferred embodiment of the invention a method is disclosed for forming a microwaveable cup which is heatable in the presence of microwave energy to warm the contents of the cup. A cup is provided having a cup body with an open interior, the cup body having a cup liner which is received within the open interior thereof. The cup liner has an external liner wall which is spaced-apart from the cup body to define an open space within the interior of the cup body. The external liner wall of the cup liner is coated with a curable, microwaveable composition. Thereafter, the cup liner is sealed within the open interior of the cup body. The curable microwaveable composition can be a microwaveable, room temperature vulcanizable composition which is allowed to cure without the application of external heat. Alternatively, the curable microwaveable composition can be a heat curable microwaveable composition, the composition being cured by placing the cup and sealed liner within a microwave oven and actuating the oven to heat the heat curable microwaveable composition.

Additional objects, features and advantages will be apparent in the written description which follows.

DETAILED DESCRIPTION OF THE INVENTION

Figure 1:
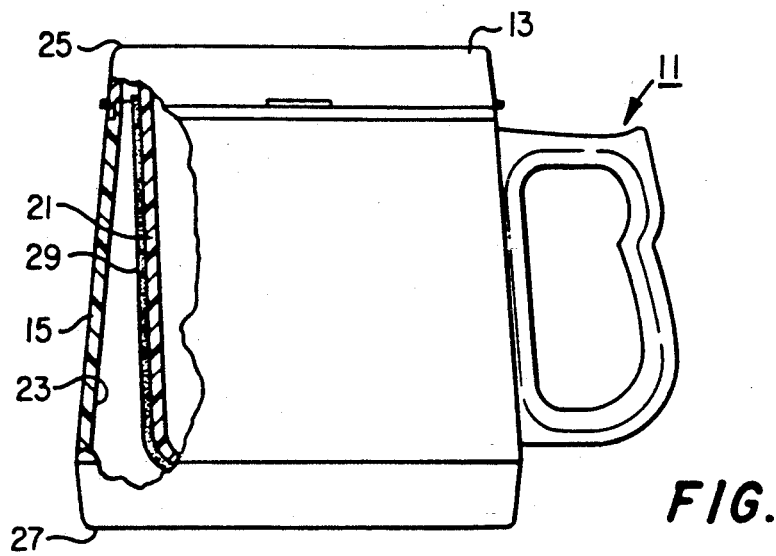
FIG. 1 is a side, plan view of a microwaveable container of the invention with a portion of the container exterior broken away for ease of illustration.

The method of the invention is used to produce a microwaveable container, such as the cup 11, shown in FIG. 1. The cup 11 is heatable in the presence of microwave energy to warm contents placed within the interior 13 of the cup. The cup also has improved insulating qualities for retaining the heat energy for an extended period of time.

Figure 2:
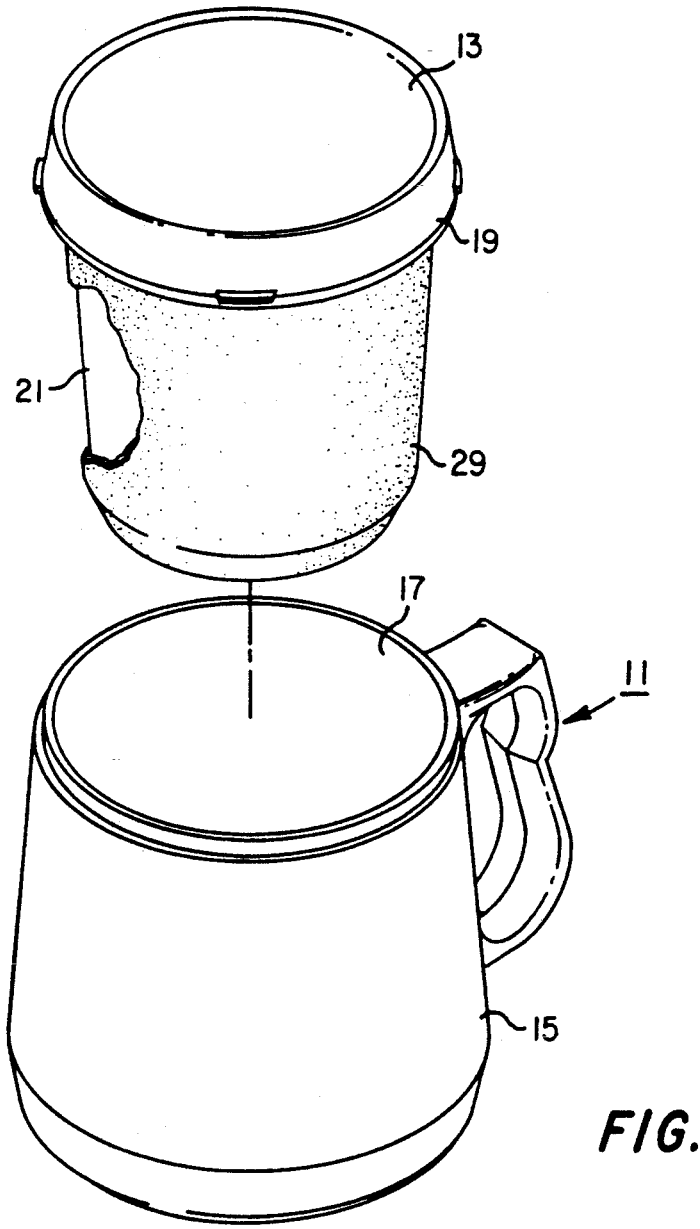
FIG. 2 is an exploded view of the microwaveable container of FIG. 1 showing the container body and container liner received within the open interior of the body.

In the case of the cup 11, a cup body 15 is provided with an open interior 17 (FIG. 2). A cup liner 19 having an external liner wall 21 is received within the open interior 17 of the cup 11 with the liner wall 21 being spaced-apart from the cup body 15 to define an open space within the interior of the cup body. As shown in FIG. 1 the open space is an annular opening 23 which runs circumferentially about the liner wall 21, with the space gradually increasing in width from the cup lip 25 in the direction of the cup base 27.

In the case of the cup 11, the cup liner 19 is first coated on the external liner wall 21 with a curable, microwaveable composition 29. The curable microwaveable composition is preferably a microwaveable, room temperature vulcanizable composition which is allowed to cure without the application of external heat. Thus, the room temperature vulcanizable composition can comprise a room temperature vulcanizable matrix material having blended therein an electromagnetic absorptive material. Most preferably, the room temperature vulcanizable matrix material is a room temperature vulcanizable rubber, such as the dimethyl siloxane of the formula:

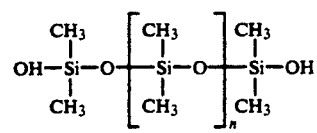

where n can range from about 200 to 1400, preferably about 500–600.

Room temperature vulcanizable silicone rubbers of the above type will be familiar to those skilled in the art and are commercially available from a number of sources. Liquid room temperature vulcanizing (RTV)

silicone rubber is supplied as a liquid to which a catalyst is added before using. These products generally vulcanize at room temperature in from about 10 minutes to 24 hours to form a rubbery silicone solid. A discussion of the preparation of silicone compounds can be found, for example, in: Eaborn, D., *Organosilicone Compounds*, Academic Press, New York, 1959; Montermoso, J.C., *Silicone Rubbers;* Morton, E.D., *Introduction To Rubber Technology*, Reinhold Publishing Corp., New York, 1959; Rochow, E.G. *An Introduction To The Chemistry Of Silicones*, John Wiley & Sons, New York, 1951; and Arnold, Lionel, K., *Introduction To Plastics*, 1969, Chapter 14.

The room temperature vulcanizable composition has a particulate, electromagnetic absorptive material blended therein. A number of such materials are commercially available, including ferrites, powdered iron, powdered aluminum, and zinc oxide. The preferred absorptive materials are aluminum powder, zinc oxide and mixtures thereof, blended in the range from about 5 to 50 parts per 100 parts of dimethyl siloxane.

As will be familiar to those skilled in the RTV arts, the room temperature vulcanizable composition utilizes a cross-linker which can be a monomer such as tetraethyl orthosilicate. The cross-linker can also be a polymer, e.g., ethyl polysilicate. The ethoxy group can be methoxy, propoxy, octoxy, methoxyethoxy, as is well known in RTV technology. The cross-linker is generally present in from about 0.1 to 5.0 parts per 100 parts dimethyl siloxane.

The room temperature vulcanizable composition utilizes a catalyst which is normally an organo tin diacylate. The catalyst can also be tin dioctoate. The catalyst is normally present in the range from about 0.1 to 3.0 parts per 100 parts dimethyl siloxane.

A particularly preferred microwaveable RTV composition has the following formulation:

| MICROWAVEABLE R.T.V. Formulation | |
|---|---|
| Hydroxyl end stopped fluid* | 100 Parts |
| Aluminum Powder | 20 Parts |
| Zinc Oxide | 20 Parts |
| Tetraethyl Orthosilicate | 3 Parts |
| Dibutyl Tin Dilaurate | 1.4 Parts |

*Fluid is predominantly dimethyl siloxane

Although the method of the invention has been described in terms of a two-part room temperature vulcanizable composition, the microwaveable RTV composition could also be a heat curable system, such as an addition system utilizing a platinum catalyst, e.g., the General Electric RTV 615A/615B which is normally heat cured.

The preferred, two-part RTV formulation is utilized in the method of the invention by coating the liner wall 21 of the cup liner 19 with the blended RTV containing the electromagnetic absorptive material. After adding the catalyst to the formulation and applying the formulation to the liner wall 21, the formulation is allowed to cure at room temperature. The cup liner 19 is then sealed within the open interior 17 of the cup body 15.

The heat cure (addition) RTV formulation would be used in the method of the invention by coating the RTV formulation containing the platinum catalyst on the liner wall 21 and by exposing the coated liner 19 to a sufficient heat for a sufficient time period to effect the cure of the microwaveable composition. This could be accomplished, for instance, by placing the lined cup within a microwave oven and utilizing the microwave energy to heat and cure the RTV formulation.

The microwaveable container and method of the invention offers several advantages. The microwaveable coating insulates the cup against heat loss. As an example, hot liquid was poured into three containers: (i) the RTV coated cup of the invention; (ii) a Styrofoam cup; and (iii) a ceramic cup. The resultant temperatures of fluids contained within the cup interiors were observed as the three containers were allowed to cool with the following results being observed:

| | Initial | After 10 min. | After 30 min. |
|---|---|---|---|
| (i) | 160° F. | 153° F. | 142° F. |
| (ii) | 168° F. | 150° F. | 125° F. |
| (iii) | 142° F. | 130° F. | 118° F. |

In addition to acting as an insulator, the microwaveable coating is heated by exposure to microwave energy, thereby heating the cup and cup contents to provide extra heat to the fluid within the cup. As an example, a coated cup of the invention and an uncoated cup were compared by placing each in a microwave oven for three minutes at full power. At the end of the three minute heat cycle, the temperatures of the fluids in each cup were recorded. The temperature of the fluid in the uncoated cup was approximately 190° F. while the temperature of the fluid in the coated cup of the invention was approximately 205° F.

While the invention has been shown in only one of its forms, it is not thus limited but is susceptible to various changes and modifications without departing from the spirit thereof.

I claim:

1. A method of forming a microwaveable cup which is heated in the presence of microwave energy to warm contents placed within the cup, the method comprising the steps of:

providing a cup having a cup body with an open interior, the cup body having a cup liner received within open interior thereof, the cup liner having an external liner wall which is spaced-apart from the cup body to define an open space within the interior of the cup body;

coating the external liner wall of the cup liner with a room temperature vulcanizable, microwaveable composition;

allowing the coating to cure without the application of external heat; and sealing the cup liner within the open interior of the cup body.

2. The method of claim 1, wherein the room temperature vulcanizable microwaveable composition is a hydroxyl end stopped polyorganosiloxane having blended therein an electromagnetic absorptive material.

3. A method of forming a microwaveable cup which is heated in the presence of microwave energy to warm contents placed within the cup, the method comprising the steps of:

providing a cup having a cup body with an open interior, the cup body having a cup liner received within open interior thereof, the cup liner having an external liner wall which is spaced-apart from the cup body to define an open space within the interior of the cup body;

coating the external liner wall of the cup liner with a heat curable, microwaveable composition;

sealing the cup liner within the open interior of the cup body; and curing the coating on the external liner wall of the cup liner by placing the cup and sealed liner within a microwave oven and actuating the oven to heat the heat curable microwaveable composition.

4. The method of claim 3 wherein the heat curable microwaveable composition is a polyorganosiloxane addition system utilizing a platinum catalyst.

* * * * *